Dec. 3, 1929.  A. F. L. SCHMIDT  1,737,735
CULINARY MEASURING RECEPTACLE
Filed May 27, 1926
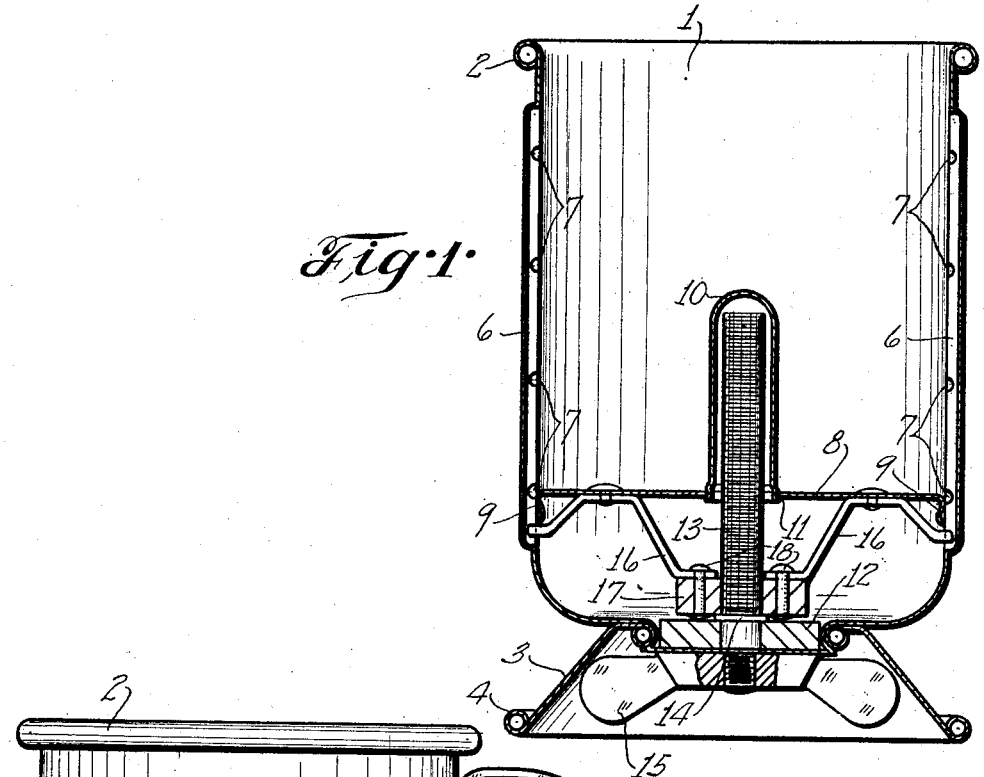
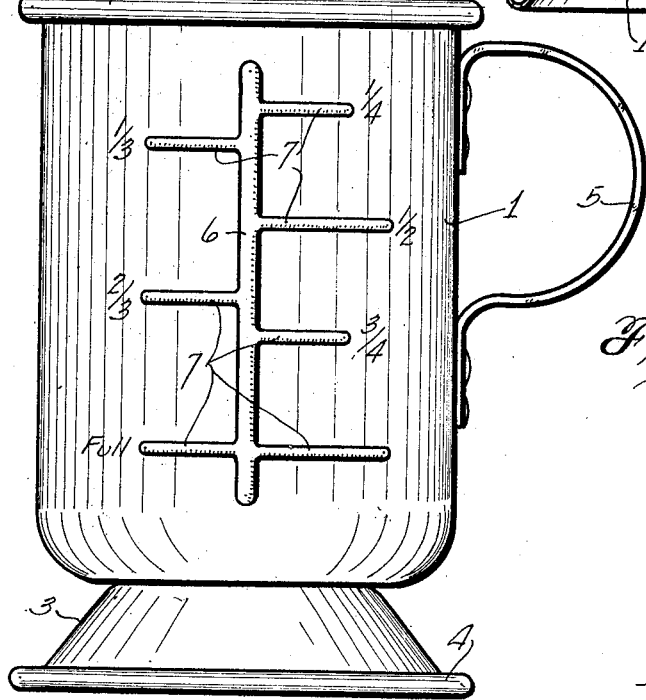
INVENTOR
Albert F. L. Schmidt.
By W. L. Dempsey
ATTORNEY Patented Dec. 3, 1929

1,737,735

UNITED STATES PATENT OFFICE

ALBERT F. L. SCHMIDT, OF WEBSTER GROVES, MISSOURI

CULINARY MEASURING RECEPTACLE

Application filed May 27, 1926. Serial No. 112,043.

My invention relates to measuring receptacles, and more specifically to those used for dry measure in contra-distinction to liquid measure.

The object of my invention is to provide a measuring receptacle that can be instantly adjusted to measure ¼, ⅓, ½, ⅔, ¾ or full capacity, and with other markings suitable to other purposes, so that the receptacle can be used for measuring any fractional portion of a given quantity as often as it is desired or necessary, without visual assistance.

Another object of my invention is to produce an adjustable measuring receptacle in which the adjusting mechanism is simple, positive and accurate in operation, durable in use, and applicable to measures for commercial and household use, with economical advantage to manufacturers.

Other objects and advantages of my invention will be apparent from the specification, claim and drawings in which:

Fig. 1 is a vertical cross-section showing the adjusting mechanism.

Fig. 2 is a perspective view of my improved measuring receptacle.

In the manufacture of candies and other confections that are packed and sold in small boxes or cartons, in which it is necessary to deposit an equal amount in each box or carton, the usual method is either to weigh each separate batch, or measure it in a suitable measuring receptacle.

Also, in the culinary practice, recipes for making different desserts and other articles of food, usually call for so many "cups" of each ingredient, or ½ "cup", or ¼ "cup", and the housewife is left entirely to guesswork as to when the "cup" is half full, etc. Of, if she happens to have a graduated measuring cup, it is necessary that the cup be filled with the proper amount, which can only be visually determined.

Therefore, in order to make it easier to measure, and very much more accurate, I have devised a receptacle that can be instantly set to measure any fractional portion of a "cup" desired, so that accuracy will be obtained with certainty, even in the dark.

My preferred method of construction consists of an outer cylindrical portion 1, stamped from any suitable sheet metal, having a rolled top 2, or any other suitable finish, and a base 3, rigidly attached to the cylindrical portion 1, and having a suitable hem or roll 4 turned about its lower marginal edge. A conventional handle 5 is provided.

At diametrically opposite sides of the cylindrical portion 1, a channel 6 is provided, parallel with the major axis of the receptacle, and having a plurality of laterally disposed channels 7, of less depth, stamped in the cylindrical portion 1, so that both the vertically disposed channel 6 and the lateral channels 7 are ridged on the outside of the receptacle, the channel portions being open to the interior of the receptacle.

A movable bottom 8 is provided, of sufficient size to entirely fill the interior of the cylindrical portion 1, so that the marginal edge of the movable bottom 8 slidably contacts with the interior periphery of the receptacle. About the marginal edge of the movable bottom 8, a downwardly turned flange 9 is provided, adapted to slidably engage the interior walls of the receptacle with a fit sufficiently close to prevent powdery substances from escaping about the marginal edge of the movable bottom.

In the geometrical center of the movable bottom 8 is an aperture enclosed by a cylindrical covering 10 rigidly affixed at its lower end 11 to the slidable bottom 8, adapted to enclose a threaded bolt, later described.

The central portion of the bottom of the cylindrical portion 1 is suitably re-inforced, as shown at 12, the upper part of the re-inforced members 12 having a horizontally disposed, plane surface adapted to hold a threaded bolt 13 against longitudinal movement by means of a collar 14, rigidly attached to the threaded bolt, which may be rotated in either direction by means of the rigidly attached wing bolt 15.

The movable bottom 8 is supported by a plurality of braces 16, rigidly attached to a threaded nut 17, by rivets 18, or other suitable means. The outer ends of the braces 16 are adapted to engage the longitudinal channels 6, thereby preventing the rotation of the nut 17 when the wing bolt 15 is rotated for the purpose of adjusting the bottom 8.

At the outer ends of the lateral channels 7 are markings indicating that when the movable bottom is adjusted to the point opposite the marking, the measure will hold a ½, ¼, ⅓, ⅔, ¾ or full capacity, according to the marking opposite the channel which coincides with the marginal edge of the movable bottom 8.

Having fully described my invention and its method of construction and operation, what I claim as new and useful and desire to secure by Letters Patent is:

A culinary measuring receptacle of the class described, comprising an outer shell, open at one end and permanently closed at the other end, a movable disc horizontally disposed within said shell, means for axially moving said movable disc, axially and oppositely disposed channels in said outer shell, a plurality of lateral channels extending outwardly and circumferentially from said axial channels, enclosed means for supporting said movable disc, means for preventing rotary movement of said disc, legends embossed upon the said outer shell opposite each of said lateral channels indicative of the quantity capacity of said measuring receptacle.

In witness whereof I have hereunto affixed my signature this 22 day of May, 1926.

ALBERT F. L. SCHMIDT.